(No Model.)

W. E. SHIELDS.
POWER TRANSMITTER FOR WINDMILLS.

No. 522,307. Patented July 3, 1894.

WITNESSES:
Lewis E. Flanders
Lois Moulton

INVENTOR
William E. Shields
BY
Luther V. Moulton
ATTORNEY.

UNITED STATES PATENT OFFICE.

WILLIAM E. SHIELDS, OF NASHVILLE, MICHIGAN, ASSIGNOR OF ONE-HALF TO WILLIAM H. YOUNG, OF SAME PLACE.

POWER-TRANSMITTER FOR WINDMILLS.

SPECIFICATION forming part of Letters Patent No. 522,307, dated July 3, 1894.

Application filed September 19, 1893. Serial No. 485,923. (No model.)

*To all whom it may concern:*

Be it known that I, WILLIAM E. SHIELDS, a citizen of the United States, residing at Nashville, in the county of Barry and State of Michigan, have invented certain new and useful Improvements in Power-Transmitters for Windmills; and I do hereby declare the following to be a full, clear, and exact description of the invention, such as will enable others skilled in the art to which it appertains to make and use the same.

My invention relates to improvements in a device for transmitting the intermittent reciprocating motion of the pump rod of a wind-mill to machines having a continuous rotary motion, and its object is to provide the same with certain new and useful features, hereinafter more fully described and particularly pointed out in the claims, reference being had to the accompanying drawings, in which—

Figure 1:
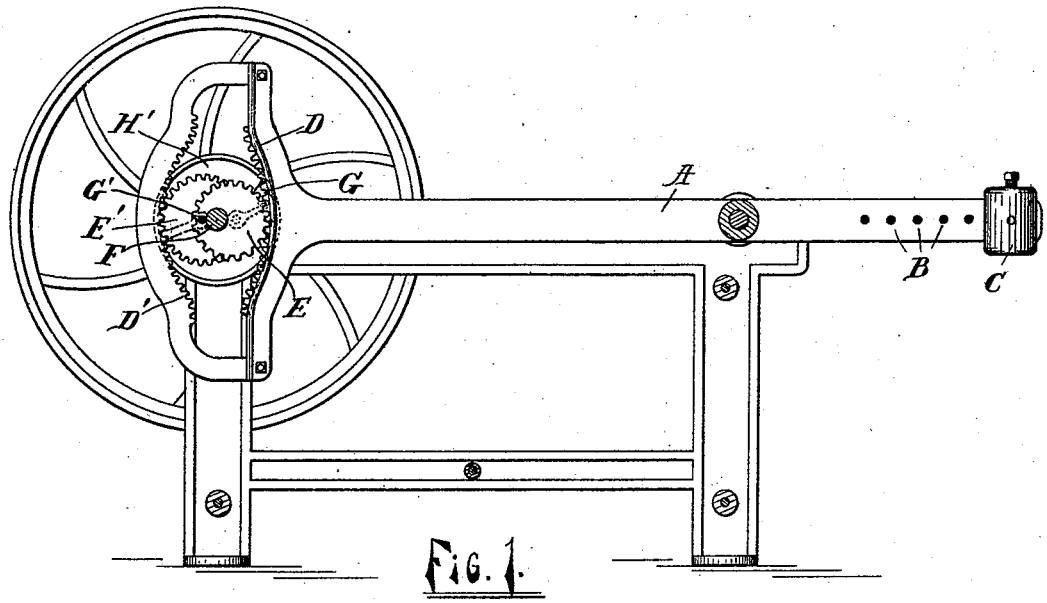
Figure 2:
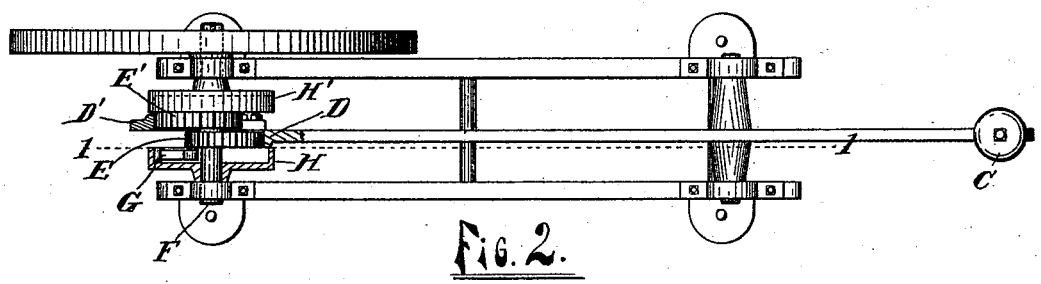
Figure 3:
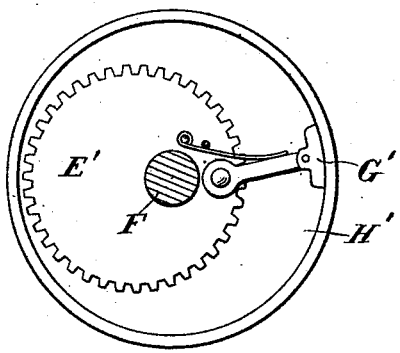

Figure 1 is a longitudinal vertical section on the line 1—1 of Fig. 2, of a device embodying my invention; Fig. 2 a plan view of the same with parts broken away to show the construction; and Fig. 3 a detail of the mechanism connecting the pinions and drive wheels.

Like letters refer to like parts in all of the figures.

A is a lever pivoted intermediately to a suitable frame to vibrate in a vertical plane. At one side of said pivot is a series of holes B, at which points may be attached the pump rod of the wind-mill, the distance from the pivot of such attachment being determined by the length of strike of said rod, the shorter said stroke the nearer the pivot and vice-versa.

C is a counterbalance weight, which is adjustable to balance the lever A, together with the pump rod of the mill. Said lever A is also provided at one end with two irregularly curved racks D and D', which are in different vertical planes and respectively engage pinions E and E' eccentrically mounted and freely rotative on the shaft F, from which shaft motion is taken to any suitable machinery.

Fixed upon the shaft F and adjacent to the pinions E E' are cupped wheels H, H', each of which is driven in one direction only by a friction pawl G and G' attached to the respective pinions E and E'. The rack D continuously engages the pinions E at one side of the shaft, and the rack D' continuously engages the pinion E' at the other side of the shaft whereby said pinions simultaneously rotate in opposite directions, thus one of said pinions at each stroke of the lever rotates in the direction that the shaft F is to be turned and one of the friction pawls G is arranged to drive on the up stroke of the lever and the other pawl G' is arranged to drive on the down stroke of the same. The stroke of the lever A being determined, the length of the racks D and D', and the diameters of the pinions are such that each pinion will rotate at the same speed, and each will make about one entire revolution to each stroke of the lever A, reciprocating as the lever vibrates. The rack nearer the pivot of the lever, and the corresponding pinion being smaller than the other rack and pinion. As the lever moves more rapidly near the middle of the stroke and slower near the ends of the same, and the shaft rotates at a uniform rate, this difference in motion is compensated for by making the pinions eccentric and the racks in suitable irregular curves to properly mesh therewith, whereby the racks engage the small side of the eccentric pinions at the ends of the stroke and the large sides of the same at the middle of the stroke, thus the rotation of the pinions relative to the motion of the racks D, D', and lever A is accelerated, near the ends of the stroke and retarded near the middle and thus made substantially uniform with the rotative motion of the shaft, thus giving a steady forward impetus to the same during the entire stroke of the lever. It is obviously immaterial at which side of the pivot the pump rod of the mill is attached to the lever A.

What I claim is—

1. In a power transmitter, in combination with a continuously rotating shaft, a reciprocally rotative pinion eccentrically mounted and freely rotative on the same, an irregularly curved and reciprocating rack continuously engaging said pinion and mechanism to transmit motion from said pinion to said shaft, substantially as described.

2. In a power transmitter, in combination with a rotative shaft, and a pivoted lever, a pinion eccentrically mounted and freely rotative on said shaft, and an irregularly curved rack continuously engaging said pinion, and means for transmitting motion in one direction only, from said pinion to said shaft, substantially as described.

3. In a power transmitter, in combination with a rotative shaft and a pivoted vibrating lever, a wheel fixed on said shaft, an eccentric pinion mounted and freely rotative on said shaft, an irregularly curved rack continuously engaging said pinion and a pawl connecting said pinion and wheel, substantially as described.

4. In a power transmitter, in combination with a shaft, and a pivoted vibrating lever, pinions of differing diameters and eccentrically mounted and freely rotative on said shaft, racks on said lever and engaging said pinions at opposite sides of said shaft, cupped wheels fixed on said shaft and oppositely acting friction pawls connecting said pinions and wheels, substantially as described.

In testimony whereof I affix my signature in presence of two witnesses.

WILLIAM E. SHIELDS.

Witnesses:
  WALTER WEBSTER,
  GEO. W. FRANCIS.